United States Patent [19]
Marincic et al.

[11] Patent Number: 5,603,737
[45] Date of Patent: Feb. 18, 1997

[54] ELECTRODE STRUCTURE FOR ELECTROCHEMICAL CELL HAVING A RECTANGULAR HOUSING

[75] Inventors: Nikola Marincic, Winchester; Luka Rabadjija, Newton, both of Mass.

[73] Assignee: Pacesetter, Inc., Sylmar, Calif.

[21] Appl. No.: 459,682

[22] Filed: Jun. 2, 1995

[51] Int. Cl.⁶ ................................................. H01M 4/04
[52] U.S. Cl. ................ 29/23.1; 29/623.3; 429/94; 429/194; 429/218; 429/164; 429/166; 429/133
[58] Field of Search .................. 429/94, 133, 140, 429/163, 164, 194, 218, 166, 127, 130, 141, 176; 29/623.1, 623.3

[56] References Cited

U.S. PATENT DOCUMENTS

| | | | |
|---|---|---|---|
| 3,530,001 | 4/1970 | Harivel | 429/94 X |
| 4,051,304 | 9/1977 | Snook | 429/94 X |
| 4,830,940 | 5/1989 | Keister et al. | 429/94 X |
| 5,439,760 | 8/1995 | Howard et al. | 429/94 |

Primary Examiner—M. Nuzzolillo

[57] ABSTRACT

The electrode structure includes a cathode, anode and polymeric separator, wound into an oval configuration having a length and width equal to interior dimensions of the rectangular housing. The oval shape is achieved by winding a long, flat electrode structure around a mandrel. The length of the electrode structure is chosen based upon the size of the mandrel, the interior dimensions of the housing, and the width of the electrode structure, such that, after winding, the resulting oval structure snugly fits within the rectangular housing leaving no remaining spaces, other than in corners of the housing. A leaf spring is provided between a free end of the electrode structure and an interior wall of the housing for ensuring that the electrode structure remains tightly wound. Appropriate electrical contacts are provided to the anode and cathode of the electrode structure. The housing is flooded with a non-aqueous electrolyte, sealed, then employed for powering an implantable medical device for implantation within a human or animal.

8 Claims, 2 Drawing Sheets

ELECTRODE STRUCTURE FOR ELECTROCHEMICAL CELL HAVING A RECTANGULAR HOUSING

BACKGROUND OF THE INVENTION

1. Field of the Invention

The invention generally relates to electrochemical cells and, more particularly, to lithium battery cells for use in implantable devices.

2. Description of the Related Art

The surgical implantation of electronic devices in humans and animals has become a commonplace occurrence. Such devices are used for a wide range of purposes within the body. The most commonly known of such devices is the cardiac pacemaker. Other well-known implantable devices are employed for stimulating or sensing, or both, with respect to the brain, spinal cord, muscles, bones, nerves, glands, or other body organs or tissues.

Implantable devices are becoming more and more complex and commonly include sophisticated data processing hardware such as microprocessors, or related devices, ROM and RAM memories, LSI (Large Scale Integration) devices as well as other computer hardware. In many cases, information is transmitted to and from the implantable device to external monitoring equipment and such information may include device identification, biological data, parameters of present operation of the device (from previous settings), technical information concerning proper functioning of the device, patient and physician data, up-to-date programming for the device and verification of information transmitted to and from the device.

With more and more data being processed and available within the implantable device, there is a need to transmit more and more data from the implanted device to external devices for analysis, reprogramming of the implantable device, or for other purposes.

As a result of the increase sophistication of implantable devices and particularly due to the increased amount of data required to be transmitted from the device, the need to provide improved power sources for the implantable devices has increased greatly. -There are, of course, limitations on the design of power cells for use in implantable devices, especially with regard to the size and shape thereof. Furthermore, the power supplies must be highly reliable and be capable of providing an adequate amount of current and voltage for an extended period of time.

One commonly employed type of power supply for use in an implantable device is an electrochemical cell, particularly one employing lithium as an anode material. Typically, within such cells, a lithium metal foil anode is provided in combination with a current collector having a porous carbon cathode material coated thereon. The anode and cathode are mounted to opposing side surfaces of a polymeric separator. The resulting electrode structure is mounted within a housing which is at least partially filled with a liquid electrolyte such as thionyl chloride. To provide maximum efficiency it is preferred that the electrode structure fill a substantial position of the entire internal volume of the housing, as any remaining space does not increase the current or voltage capacity of the Cell but merely represents wasted space. Such is a particular problem for electrochemical cells for use in implantable devices wherein the amount of available space is at a premium.

An example of a spiral wound electrode structure is illustrated in FIG. 1. The spiral electrode structure 10 includes anode and cathode portions 12 and 14 separated by a polymeric separator 16. FIG. 1 also illustrates appropriate positive and negative electrical contacts to the anode and cathode portions. A cylindrical button housing 18 is also illustrated in FIG. 1.

By substantially matching the overall shape of the electrode structure 10 with the interior cylindrical shape of the housing 18, the space within the housing is efficiently used and little or no excess space remains. (It should be noted that, within the illustration of FIG. 1, an electrode structure having only a few windings is illustrated. As a result, the amount of empty space remaining within the cell housing is exaggerated within FIG. 1. In actual cylindrical cells, little or no space remains between the interior side wall of the housing and the electrode structure.)

Another housing arrangement employed for electrochemical cells is a rectangular arrangement. Within rectangular cells, a problem occurs in efficiently packing the electrode cell within the housing. If a circular spiral wound electrode structure is employed, a considerable amount of space remains empty within corners of the rectangular cell. Accordingly, various alternative electrode structures have been developed to allow a more efficient packing of the electrode structure into the rectangular housing.

One such configuration, illustrated in FIG. 2, employs a set of parallel plate anode and cathode electrodes 20 and 22 mounted side-by-side within a rectangular housing 26 with each pair of electrodes separated from each other by a polymeric separator 24. Each individual parallel plate structure preferably has a length equal to the interior dimensions of a rectangular housing 26. The rectangular volume within the housing 26 is completely filled. However, by providing a set of separate anodes and cathodes, separate electrical contacts are required for each set. (The electrical contacts are shown schematically in FIG. 2.) For electrochemical cells for use in implantable devices wherein the overall size of the cell must be quite small, the provision of parallel plates, each with respective electrical connections, is difficult and expensive to achieve and, because of the many electrical contacts, the cell may not be as reliable as desired.

It is generally preferred to provide a single continuous electrode structure, such as employed in the cylindrical cells discussed above. One conventional arrangement for mounting a continuous electrode structure within a rectangular cell is illustrated in FIG. 3. Within the cell of FIG. 3, a single continuous electrode structure 28 having an anode 30 and a cathode 32 is bent into a zig-zag configuration with numerous hairpin blends. The electrode structure 28 is mounted within a rectangular housing 34. Positive and negative electrical contacts (shown schematically within FIG. 3) are provided only at opposing ends of the structure. Although such a configuration requires only a limited number of electrical contacts, the bending of the electrode structure into a zig-zag shape can result in damage to the electrode structure. In particular, tearing may occur in the vicinity of the hairpin bends resulting in loss of active material and in possible internal short circuits through the polymeric separator between the anode and the cathode.

FIG. 4 illustrates another conventional method for fabricating an electrode structure for mounting within a rectangular housing. In the arrangement of FIG. 4, a long thin rectangular anode structure 37 is positioned perpendicular to a long thin rectangular cathode structure 36. Thereafter, the anode and cathode structures are folded, along the arrows shown, to yield a substantially rectangular structure, which is thereafter inserted into a rectangular housing. (A polymeric separator, not shown, is preferably positioned between the anode and cathode structures prior to folding of the structure such that the resulting electrode structure includes a polymeric separator between each adjacent anode and cathode segment.) However, the resulting structure suffers from many of the same disadvantages with the structure of FIG. 3. In particular, the presence of sharp hairpin bends within the electrode structure can result in internal short circuits and in regions of poor electrical contact.

It would be desirable to provide an improved electrode arrangement for use in rectangular electrochemical cells, particularly small cells for use in implantable devices, which avoids the disadvantages of prior art arrangements described above. Aspects of the present invention are drawn to such improved arrangements and to methods for fabricating same.

SUMMARY OF THE INVENTION

An improved electrode structure is provided for use within an electrochemical cell having a rectangular housing, particularly a cell for use within implantable devices. In accordance with one aspect of the invention, a continuous electrode structure is wound, around a removable mandrel, into a generally oval shape for insertion into the rectangular housing. By winding the continuous electrode structure into an oval configuration, many of the advantages of conventional circular spiral wound configurations are achieved, while also yielding a structure which adequately fills the interior volume of the rectangular housing. By avoiding the need to provide sharp hairpin bends in the electrode structure, the disadvantages noted above, such as those involving internal short circuits, are substantially avoided.

In accordance with an exemplary embodiment of the invention described herein, the continuous electrode structure includes a metal anode having lithium, sodium, calcium or the like, and a solid cathode having polycarbonmonoflouride coated on a current collector. The anode and cathode materials are mounted to opposing side surfaces of a polymeric separator. The electrode structure is wound around a thin flat mandrel having a length and width selected such that, upon completion of the winding and upon removal of the mandrel, the resulting oval spiral electrode structure assumes the length and width of the interior volume of the rectangular housing. One electrical contact is provided to the anode near the interior of the spiral wound structure and a second electrical contact is provided to the cathode at the outermost edge of electrode structure. A leaf spring is positioned between an interior side wall of the rectangular housing and an outermost end of the electrode structure for ensuring that the spiral wound structure, particularly the exterior portion thereof, remains tightly compressed. The housing is filled with an appropriate amount of a liquid electrolyte solution, such as lithium hexaflouroarsenate dissolved in tetrahydrofurane, then tightly sealed.

By employing an oval spiral-wound electrode structure, only a small portion of the interior volume of the cell remains empty, yet the disadvantages of prior art rectangular electrode structures described above are avoided. Although the interior volume is not completely filled with the electrode structure, it has been found that a sufficient portion is filled and the presence of any remaining unfilled volume is offset by the advantages gained by employing a spiral wound structure.

Hence, the general object of the invention set forth above is achieved. Other objects and advantages of the invention will be apparent from the descriptions provided herein and from the attached drawings.

DETAILED DESCRIPTION OF THE INVENTION

The invention relates to a method and apparatus for configuring an electrode structure for mounting within a rectangular housing of an electrochemical cell for use in an implantable device. For the purposes of explanation, exemplary embodiments of the invention are set forth. However, the invention may be practiced or configured in alternative embodiments. In some instances, well known elements, devices, processes steps and the like are not set forth in detail herein to avoid unnecessarily obscuring more important aspects of the invention.

Figure 1:
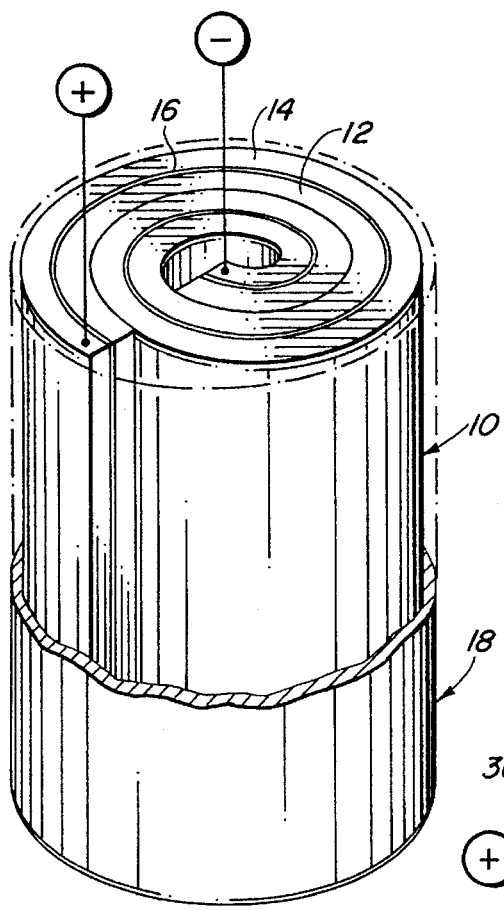
FIG. 1 is a top view, partially in schematic form, of a portion of an electrochemical cylindrical cell employing a spiral wound cylindrical electrode structure configured in accordance with the prior art.
Figure 3:
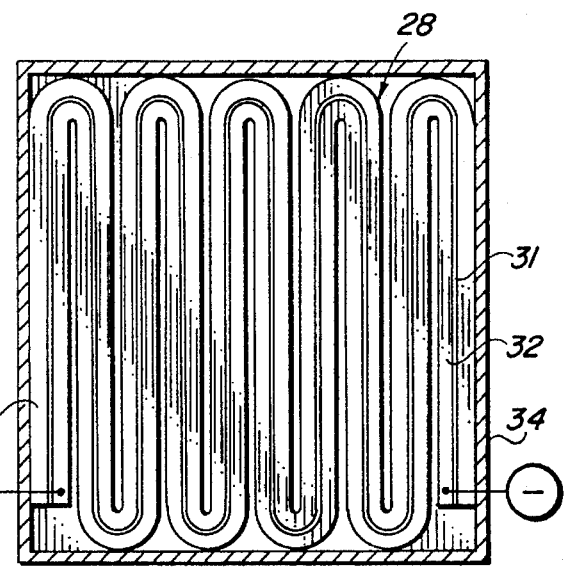
FIG. 3 is a top view, partially in schematic form, of a portion of a rectangular electrochemical cell having an electrode structure folded in a zig-zag pattern configured in accordance with prior art.
Figure 2:
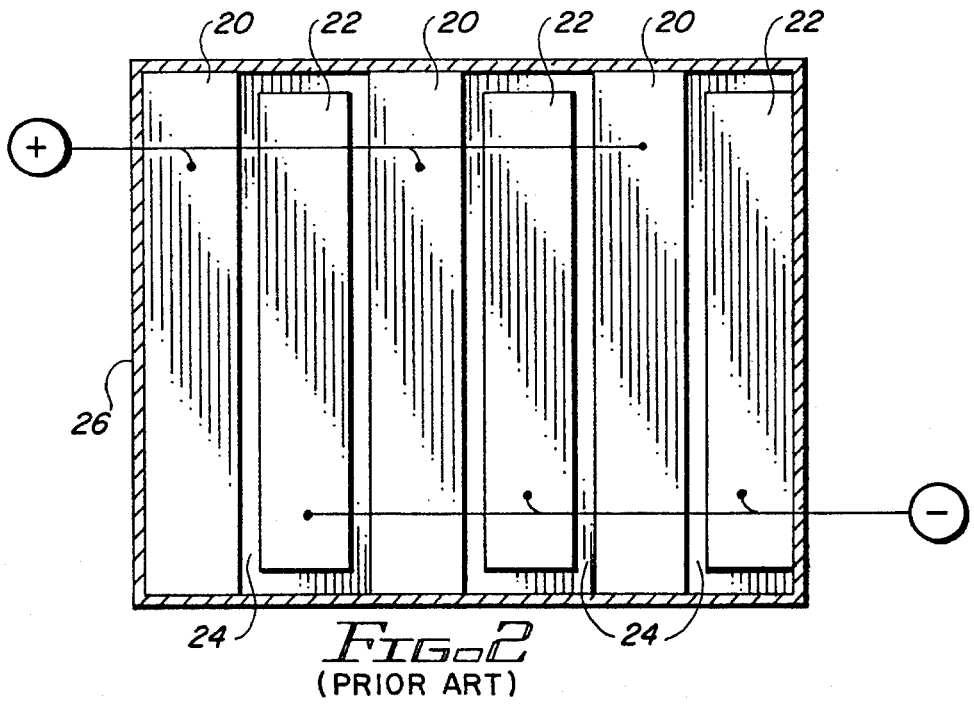
FIG. 2 is a top view, partially in schematic form, of a portion of a rectangular electrochemical cell having sets of parallel-mounted electrode plates configured in accordance with the prior art.
Figure 5:
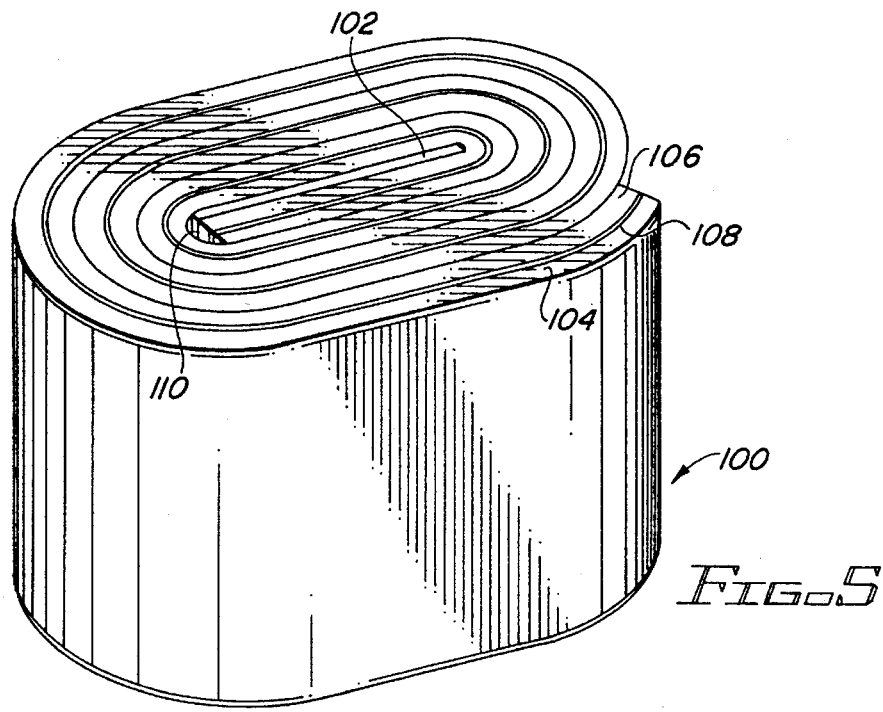
FIG. 5 is a perspective view of an oval spiral wound electrode structure configured in accordance with principles of the invention.

FIG. 5 illustrates an electrode structure 100 wound around a mandrel 102 into a generally oval spiral configuration. The electrode structure 100 includes an anode 104, a cathode 106, and a polymeric separator 108. The electrode structure 100 is formed from a single rectangular flat electrode structure by winding the flat electrode structure around the mandrel 102. This is achieved by affixing or holding an interior end 110 of the electrode structure 100 to a side surface of the mandrel 102, then wrapping the electrode structure around the mandrel to yield the configuration as shown. Such may be performed manually or by using automated equipment, such as equipment commonly employed for winding circular spiral electrodes, modified as needed to achieve winding around the mandrel. Preferably, the winding of the electrode structure 100 is performed to achieve as tight a spiral structure as possible, without risking damage to the structure during wrapping.

Figure 6:
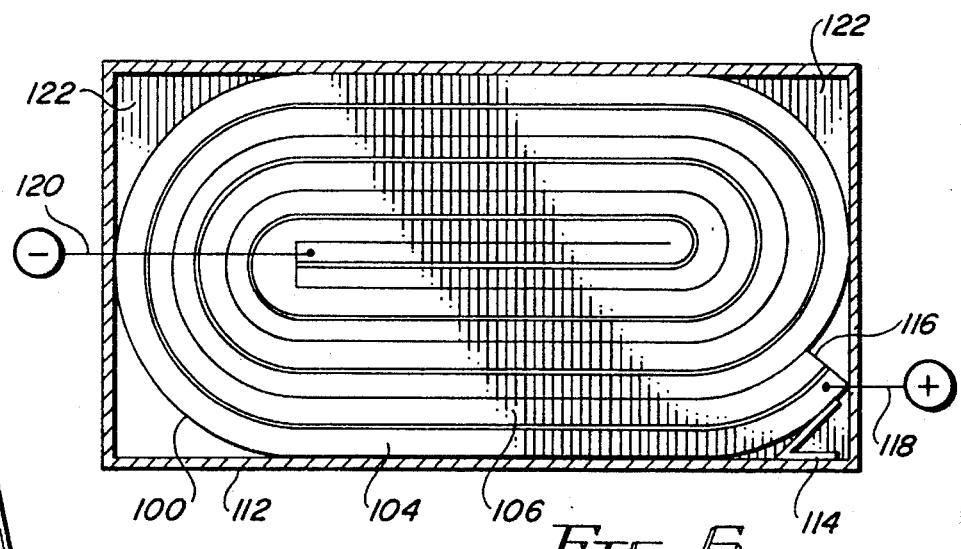
FIG. 6 is a top view of a rectangular electrochemical cell having the oval spiral wound electrode structure of FIG. 5.
Figure 4:
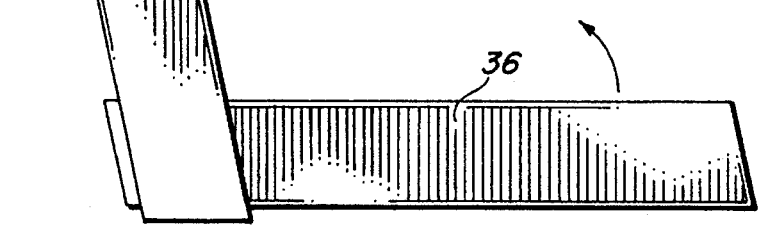
FIG. 4 is a top view of electrode and anode components of an electrode structure illustrating a method by which the components are folded, one upon the other, to yield a rectangular electrode structure as provided in the prior art.

The mandrel 102 is removed from within the spiral wound electrode structure 100, then the electrode structure 100 is mounted or placed within a rectangular housing 112 of an electrochemical cell as shown in FIG. 6. A leaf spring 114 is positioned between an interior side wall of the housing 112 and a free end 116 of the electrode structure 100. An electrical contact 118 is connected to the anode 104 of the electrode structure 100 near the free end 116. A second electrical connection 120 is provided to the cathode of the electrode structure 100 near the interior end 110. The leaf spring 114 and the two electrical contacts 118 and 120 may be configured and mounted in the same manner as employed for the spiral wound cylindrical cell electrodes and, as such, will not be described in further detail herein.

A liquid electrolyte 122 is poured into housing 112, then a top (not shown) is mounted onto the housing 112 and sealed or permanently affixed thereto. The final rectangular electrochemical cell and any necessary supporting electrical devices or connections is mounted within an implantable device, such as a pacemaker, for ultimate implantation into a human or animal.

Although a wide variety of electrochemical cell components may be employed, in one exemplary embodiment, the anode 104 is formed from a thin sheet of metal coated with lithium, sodium, calcium or alloys thereof. The cathode 106 is formed of a current collector, such as an expanded screen current collector, coated with polycarbonmonoflouride. The separator 108 is formed of a polymeric separator material. The liquid electrolyte material is a non-aqueous electrolyte of lithium hexaflouroarsenate dissolved in tetrahydrofurane.

As noted above, the size of the original electrode material is chosen before winding based upon the size of the mandrel 102 and upon the interior length and width of the housing 112 to yield a resulting oval wound electrode structure which fits snugly within the housing 112 without any substantial space between the electrode structure and the interior side walls of the housing, other than in the corners of the housing.

In an alternative embodiment, rather than removing the mandrel prior to insertion of the electrode structure into the cell housing, the mandrel may simply be left within the center of the electrode structure and inserted along with the electrode structure into the housing. As can be appreciated, the overall length of the electrode structure, prior to winding, should be chosen to compensate for the presence of the mandrel such that, after winding, the electrode structure and mandrel fit snugly within the cell housing.

In a further alternative embodiment, the mandrel can be cylindrical. After the electrode material is wound, the mandrel is removed and the electrode material is compressed, thereby yielding an oval shape. With appropriate selection of the size of the original electrode material and mandrel diameter, the wound electrode will fit the housing as well as the above embodiment.

What has been described is an improved method for configuring an electrode structure for mounting within a rectangular housing of a electrochemical cell for use within an implantable device. Although certain exemplary embodiments are described herein, it should be understood that principles of the invention may be applied to alternative structures, embodiments and methods as well. Hence, the descriptions provided herein should not be construed as limiting the scope of the invention.

What is claimed is:

1. A method for fabricating an electrode structure for mounting within a rectangular housing of an electrochemical cell for use within an implantable device, the housing having a predetermined interior length, width, and height, the method comprising the steps of:

providing a flat electrode structure having a width no greater than the height of the housing; and winding the electrode structure into an oval shape by
      providing a circular cylindrical mandrel having a selected diameter and winding the electrode structure around the mandrel,
      removing the mandrel after winding the electrode structure, and
      compressing the electrode structure into an oval shape;

wherein the diameter of the mandrel is selected to yield a wound electrode structure, following compression, having an overall length and width matching the predetermined length and width of the interior of the housing.

2. The method, as defined in claim 1:

wherein the electrode structure comprises a metal anode and a solid cathode separated by a polymeric separator; and wherein the solid cathode comprises polycarbonmonofluoride.

3. The method, as defined in claim 1:

wherein the electrode structure comprises a metal anode and a solid cathode separated by a polymeric separator; and wherein the metal anode is formed of a material selected from a group consisting of lithium, sodium, calcium and alloys thereof.

4. A method for fabricating an electrochemical cell for use within an implantable device, the method comprising the steps of:

providing a housing having a predetermined interior length, width, and height;

providing a flat electrode structure having an anode and a cathode and having a width no greater than the height of the housing;

winding the electrode structure into an oval shape by
      providing a circular cylindrical mandrel having a selected diameter and winding the electrode structure around the mandrel,
      removing the mandrel after winding the electrode structure, and
      compressing the electrode structure into an oval shape;
      wherein the diameter of the mandrel is selected to yield a wound electrode structure, following compression, having an overall length and width matching the predetermined length and width of the interior of the housing;

mounting the electrode structure within the housing;

providing at least one electrical connection to the anode and at least one electrical connection to the cathode; and filling a portion of the housing with an electrolyte solution.

5. The method, as defined in claim 4:

wherein the electrode structure comprises a metal anode and a solid cathode separated by a polymeric separator; and wherein the solid cathode comprises polycarbonmonofluoride.

6. The method, as defined in claim 4:

wherein the electrode structure comprises a metal anode and a solid cathode separated by a polymeric separator; and wherein the metal anode is formed of a material selected from a group consisting of lithium, sodium, calcium and alloys thereof.

7. The method, as defined in claim 4, wherein the electrolyte solution comprises lithium hexafluoroarsenate dissolved in tetrahydrofurane.

8. The method, as defined in claim 4, including the further step of mounting a leaf spring between an interior wall of the housing and a free end of the electrode structure prior to the step of filling a portion of the housing with an electrolyte solution.

* * * * *